United States Patent [19]

Haga

[11] Patent Number: 5,227,888
[45] Date of Patent: Jul. 13, 1993

[54] STILL IMAGE PICKUP DEVICE WITH TWO-DIMENSIONALLY DISPLACEABLE IMAGE PICKUP SURFACE

[75] Inventor: Shunichi Haga, Kodaira, Japan
[73] Assignee: Nikon Corporation, Tokyo, Japan
[21] Appl. No.: 652,002
[22] Filed: Feb. 7, 1991
[30] Foreign Application Priority Data
  Feb. 19, 1990 [JP] Japan .................... 2-37677
[51] Int. Cl.⁵ .................... H04N 3/14; H04N 3/02; H04N 5/335
[52] U.S. Cl. .................... 358/213.28; 358/199; 358/213.11
[58] Field of Search .................... 358/209, 213.28, 214, 358/224–225, 906, 909, 211, 213.11, 212, 213.27

[56] References Cited

U.S. PATENT DOCUMENTS

| | | | |
|---|---|---|---|
| 4,543,601 | 9/1985 | Harada et al. | 358/213.28 |
| 4,707,743 | 11/1987 | Tokumitsu et al. | 358/213.13 |
| 4,959,722 | 9/1990 | Takanashi et al. | 358/211 |
| 4,992,878 | 2/1991 | Hersh | 358/213.28 |

Primary Examiner—James J. Groody
Assistant Examiner—Safet Metjahic
Attorney, Agent, or Firm—Shapiro and Shapiro

[57] ABSTRACT

A still image pickup device is provided with an image pickup element positioned on an image plane on which an object image is focused in a detection area and having an image pickup surface smaller than the detection area, for converting a part of the object image into an electrical image signal; a moving device for two-dimensionally moving the image pickup surface on the image plane; an input device for entering the image signal supplied from the image pickup element; and a control unit for controlling the moving device to move the image pickup surface based on the entry of the image signal by the input device, wherein the image pickup element converts another part of the object image into another image signal at a position to which the image pickup surface is moved and the input device enters the above-mentioned another image signal.

2 Claims, 4 Drawing Sheets

STILL IMAGE PICKUP DEVICE WITH TWO-DIMENSIONALLY DISPLACEABLE IMAGE PICKUP SURFACE

BACKGROUND OF THE INVENTION

1. Field of the Invention

The present invention relates to a still image pickup device for entering a still image with a high definition and with a wide image angle.

2. Related Background Art

In this field there is already known an arrangement of plural cameras, in which the image outputs from said cameras are mutually connected to obtain an image with a high definition and a wide image angle.

Also there is known a structure for scanning a line sensor of a large number of pixels in one direction for entering the image.

Furthermore there is known a structure for applying the pixel displacement to an area sensor, thereby displacing the pixel by a half pitch in the x and y directions at a high speed, thereby doubling the apparent number of pixels to achieve a high definition.

Such conventional structures have been associated with the following drawbacks.

Firstly, the arrangement employing plural cameras involves functional defects in that significant displacement in image due to parallax is unavoidable in taking the image of a short-distanced object, and in that blind fields are generated due to the spaces between the cameras. Also the necessity for adjustments for positions and sensitivities of the cameras complicates the structure and data processing, thus inevitably increasing the dimension of the apparatus.

Secondly, the structure utilizing the line sensor requires a long signal reading time, because the scanning operation has to be conducted over the size of the image field, and a faster scanning operation is restricted by the sensitivity of the line sensor.

Thirdly, the structure utilizing the pixel displacement method cannot be easily adapted to the image entry of a wide image angle, though it can improve the resolving power.

SUMMARY OF THE INVENTION

The object of the present invention is to provide a still image pickup device with a high definition and wide image angle, allowing a compact structure and capable of high-speed image reading.

The above-mentioned object can be attained, according to the present invention, by a still image pickup device comprising image pickup means positioned in an image detection area substantially on an image plane on which the image of an object is focused, having an image pickup surface of a smaller area than that of said image detection area, and adapted to convert said object image into an electrical image signal; image pickup surface moving means for two-dimensionally moving and stopping said image pickup within said image detection area; and image signal output means for receiving said image signal from said image pickup means at each stop position of said image pickup surface and releasing said image signal to the outside.

In the above-mentioned structure, the portion of object image focused on the image plane at each stop position of the image pickup surface is converted into a corresponding image signal, which may be combined with the other image signals to form a composite image signal.

DESCRIPTION OF THE PREFERRED EMBODIMENTS

Figure 1:
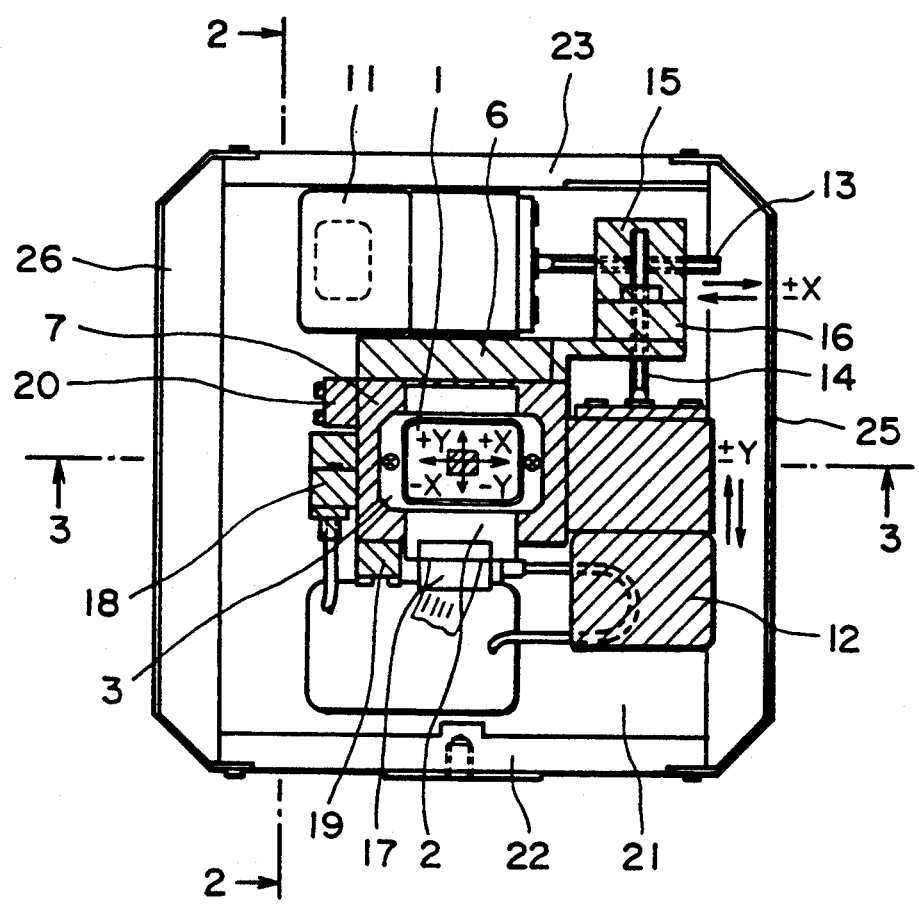
FIG. 1 is a plan view of a still image pickup device embodying the present invention.
Figure 2:
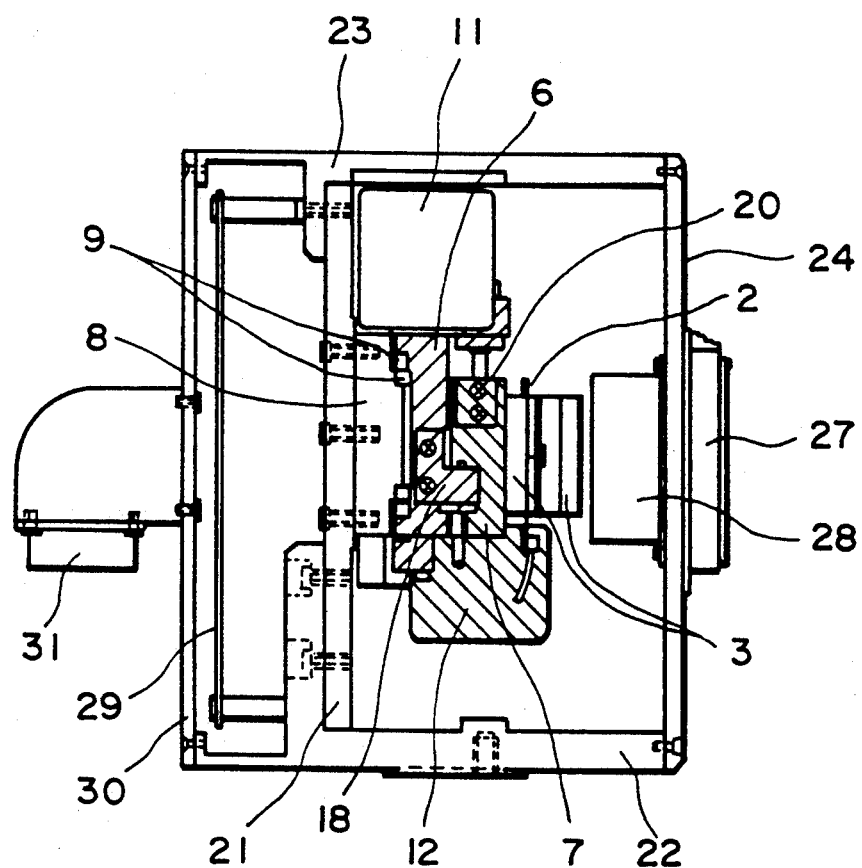
FIG. 2 is a lateral cross-sectional view of said still image pickup device along a line 2—2 in FIG. 1.
Figure 3:
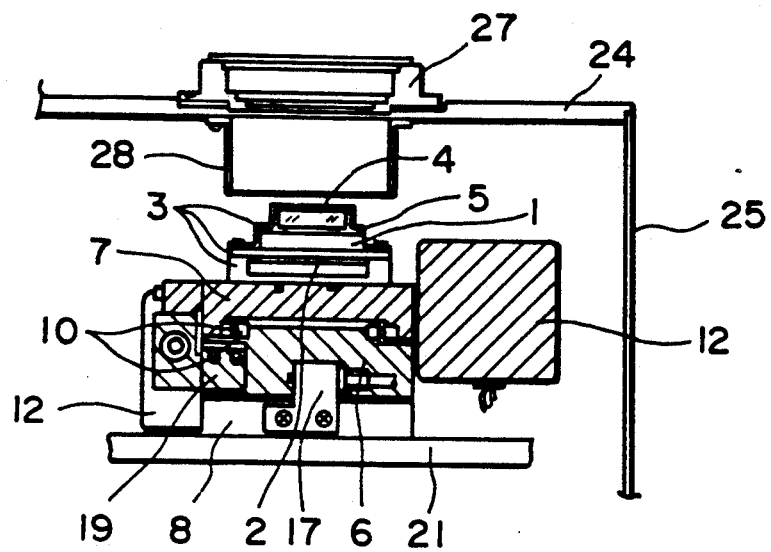
FIG. 3 is a cross-sectional view, along a line 3—3 in FIG. 1, of a mounting portion of an image pickup element in said still image pickup device.

Now the present invention will be described in detail with reference to an embodiment shown in FIGS. 1 to 3.

An image pickup element 1 is provided on an image plane of an object image formed by light entering from a phototaking lens (not shown). The image pickup element 1 is provided with an image pickup surface of an effective image field size (x, y), fixed on an image pickup element circuit board 2, and is fixed on a Y-stage 7 by means of a fixing member 3.

An optical low-pass filter 4 (shown in FIG. 3), for suppressing a false image signal is fixed on the Y-stage 7, together with the image pickup element 1, by means of the fixing member 3.

A dust preventing rubber seal 5, for preventing the image pickup surface of the element 1 from dust deposition, is provided between the element 1 and the fixing member 3 at the fixation of the element 1 and the low-pass filter 4 with the fixing member 3.

An X-stage 6 and the Y-stage 7 for two-dimensionally moving the image pickup element 1 in the X- and Y-directions are superposed with a fixed base 8 to constitute so-called X-Y stage.

The X-stage 6, supported by the fixed base 8, is rendered movable in ±X-directions with respect to said fixed base 8, by means of linear cross roller guides 9 provided in mutually engaging recessed portion of the X-stage 6 and protruding portion of the fixed base 8.

Also the Y-stage 7, supported by the X-stage 6, is rendered movable in ±Y-directions with respect to the X-stage 6 by means of linear cross roller guides 10 provided in mutually engaging recessed portion of the Y-stage 7 and protruding portion of the X-stage 6.

A movement of the X-stage 6 in the ±X-directions causes a simultaneous movement of the Y-stage 7 supported thereon in the ±X-directions, thus causing a movement of the image pickup element 1 fixed on said Y-stage 7 in the same direction.

A movement of the Y-stage 7 in the ±Y-directions causes a simultaneous movement of the image pickup element 1 in the same direction. However the X-stage 6 remains unmoved.

The X-stage 6 and the Y-stage 7 are moved in ±X- and ±Y-directions respectively by stepping motors 11, 12.

The stepping motor 11 for moving the X-stage 6 is fixed on the fixed base 8, and rotates a ball screw, constituting a power transmitting member, by a step upon receiving an electric pulse from an X-stage drive circuit to be explained later.

Similarly the stepping motor 12 for moving the Y-stage 7 rotates a ball screw 14, constituting a power transmitting member, by a step upon receiving an electric pulse from a Y-stage drive circuit to be explained later.

Said screws 13, 14 respectively engage with bearings 15, 16, which are respectively fixed on the X-stage 6 and the fixed base 8.

Consequently when the stepping motor 11 is activated to rotate the ball screw 13 by a step, the bearing 15 is moved in the ±X-direction by the screw action, and the X-stage 6 fixed to said bearing 15 is likewise moved in the same direction.

Also when the stepping motor 12 is activated to rotate the ball screw 14 by a step, the bearing 16 cannot move because it is fixed on the fixed base 8, so that the stepping motor 12 moves in the ±Y-direction by the screw action, whereby the Y-stage 7 is likewise moved in the same direction.

Reset position detecting switches 17, 18 and detecting pieces 19, 20 are provided for detecting and setting the reset positions (initial start positions of the X- and Y-stages 6, 7.

The reset position detecting switch 17 for detecting the reset position in the ±X-direction is fixed on the fixed base 8, while the detecting piece 19 is fixed on the X-stage 6. When the X-stage 6 reaches the reset position in the movement thereof in the ±X-direction, the detecting piece 19 impinges on and activates said switch 17, whereby the X-stage 6 is stopped.

Similarly the reset position detecting switch 18 for detecting the reset position in the ±Y-direction is fixed on the X-stage 6, while the detecting piece 20 is fixed on the Y-stage 7. When the Y-stage 7 reaches the reset position in the movement thereof in the ±Y-direction, the detecting piece 20 impinges on and activates said switch 18, whereby the Y-stage 7 is stopped.

The fixed base 8 is fixed on a base plate 21. Thus the X-Y stage is fixed on a box structure composed of a base plate 21, a bottom plate 22, a ceiling plate 23, a front panel 24 and side covers 25, 26.

The front panel 24 is provided with a lens mount 27 for mounting the image taking lens, and a light shield ring 28 for intercepting unnecessary light, except that coming from the phototaking lens.

A circuit board 29 provided outside the base plate 21 is connected to the circuit board 2, and serves to receive the image signal from the element 1 and effect various signal processing.

A rear panel 30 on which the circuit board 29 is fixed is provided with a camera connector 31 connected with the circuit board 29, and the image signal processed in said board 29 is transmitted to external equipment through said connector 31.

In the following there will be explained the function of the above-explained still image pick-up device, with reference to FIGS. 4 and 5, which are respectively a view showing the movement of image pickup surface and a block diagram of the signal processing system.

Figure 4:
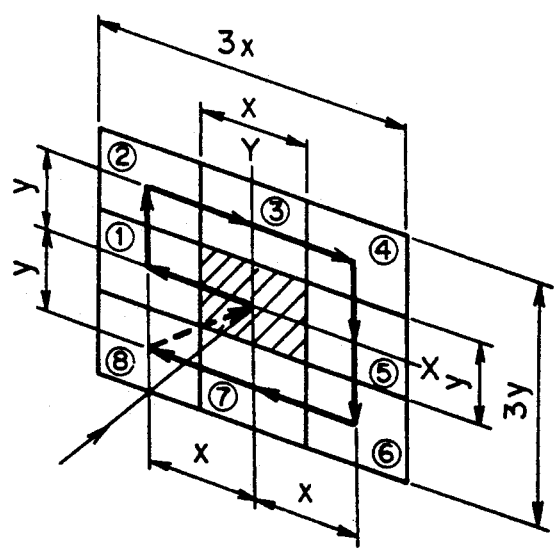
FIG. 4 is a schematic view showing the movement of the image pickup surface.
Figure 5:
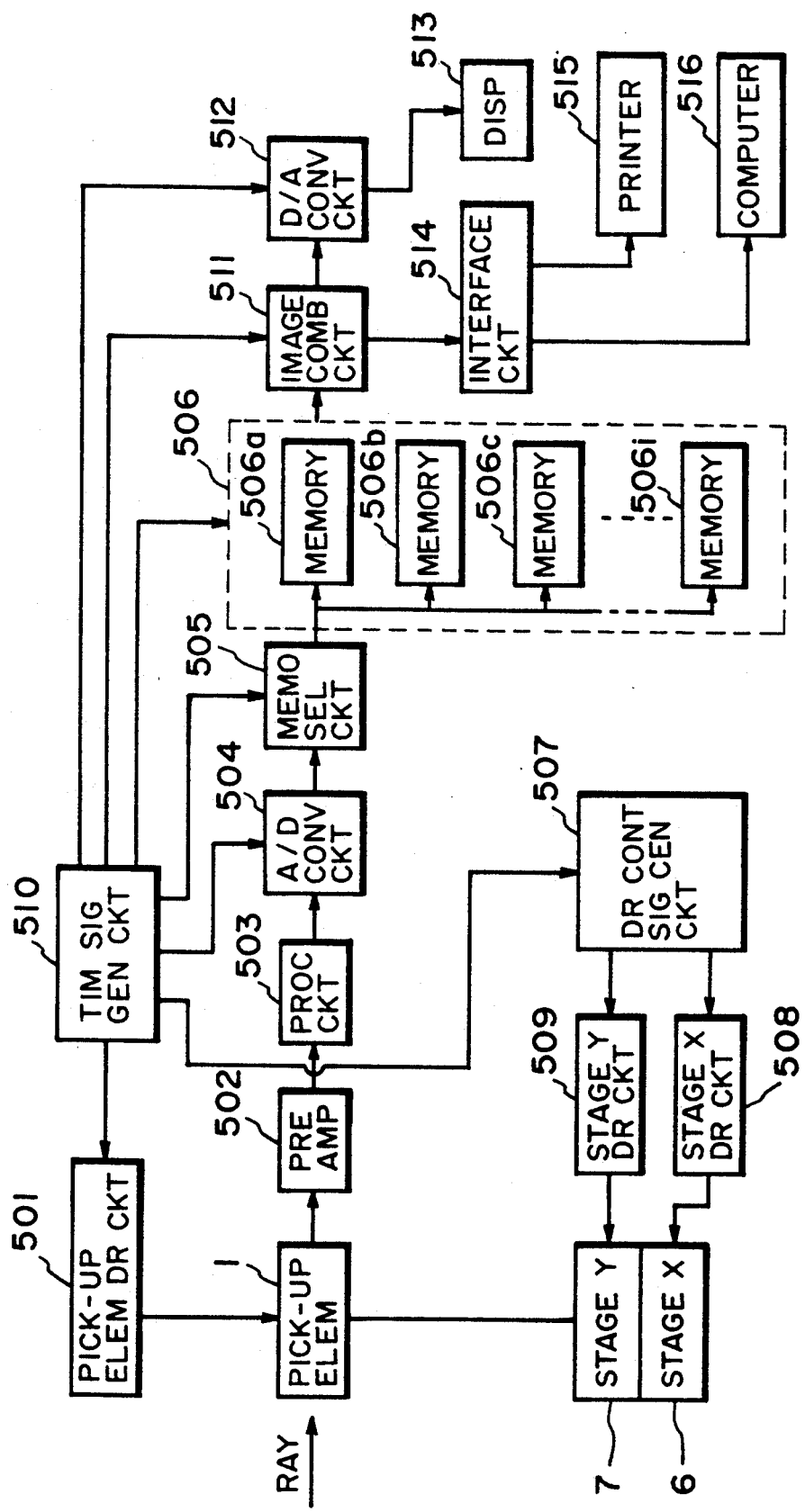
FIG. 5 is a block diagram of a signal processing system.

As shown in FIG. 4, the image pickup surface of a size (x, y) of the device of the present embodiment is moved in the image plane in an area detection area of a size (3x, 3y) to enter the image in 9 divided operations.

When the device of the present embodiment is powered, the X-stage 6 moves toward the reset position detecting switch 17, and is stopped at the reset position in the X-direction. Then the Y-stage 7 moves toward the reset position detecting switch 18 and stops at the reset position in the Y-direction, whereby the X-Y stage position is initialized. The initial state position of the X-Y stage is so adjusted that the image pickup surface of the element 1 is in the hatched area in FIG. 4.

In a state where the image pickup surface of the image pickup element 1 is positioned at the hatched area in FIG. 4, the image signal from said element 1 is read and stored in memories 506a–506i in a memory unit 506.

This operation will be explained with reference to the block diagram shown in FIG. 5.

The image signal of red, green and blue obtained by photoelectric conversion in the image pickup element 1 is read by a drive circuit 501, then amplified by a preamplifier 502, and processed and clamped in a process circuit 503. It is then converted into digital data by an A/D converting circuit 504, and is stored in one of memories 506a–506i according to the selection by a memory selecting circuit 505.

Subsequently an X-stage drive circuit 508 generates electric pulses to move the X-stage 6 so as to bring the image pickup surface to a position ① in FIG. 4, and a similar operation as explained above is repeated. Then a Y-stage drive circuit 509 generates electric pulses to move the Y-stage 7 so as to bring the image pickup surface to a position ② in FIG. 4, and a similar operation is conducted.

Thereafter a similar operation is repeated by moving the image pickup surface in succession to positions ③, ④, ⑤, ⑥, ⑦ and ⑧ in FIG. 4, whereby the image signals of nine divided areas can be respectively stored in the memories 506a–506i.

Said memories 506a–506i can respectively store the digital data of the nine divided image fields, and the memory selecting circuit 505 selects said memories 506a–506i for storage of the digital image data, according to a signal from a timing signal generating circuit 510.

A drive control signal generating circuit 507 sends control signals to the X-stage drive circuit 508 and the Y-stage drive circuit 509 for driving the X- and Y-stages 6, 7, according to signals from said timing signal generating circuit 510.

In the successive reading of the nine divided image signals, the timing signal generating circuit 510 controls the function timing of the drive circuit 501, drive control signal generating circuit 507, A/D converting circuit 504, memory selecting circuit 505 and memory unit 506.

Then, digital data of nine divided images are read from the memories 506a–506i according to the timing signal generating circuit 510, and are subjected to image synthesis in an image synthesizing circuit 511. The synthesized image data are converted in a D/A converting circuit 512 into an image signal of red, green and blue which is displayed on a display unit 513.

Also in case of digital output, the digital data are output, through an interface circuit 514, to a printer 515 or a computer 516.

The above-explained structure allows to obtain an image of higher definition with an increased number of pixels, by focusing the object image on the image plane in a detection area of an expanded image size (3x, 3y) of the present device, instead of directly focusing said image on the area of image pickup surface of the effective size (x, y) of the element 1.

Also there can be obtained an image of wider image angle, by fetching the image of a large image size (3x, 3y) by means of the image pickup element 1 of the effective image size (x, y).

In the present embodiment, the image pickup element 1 is assumed to be of a color or black-and-white single-chip device, but there may also be used a three-color separating prism and three black-and-white image pickup elements.

Also a further increase in the resolution can be attained by combining the present embodiment with the pixel displacement method.

The image is divided into nine areas in the present embodiment, but the number of division may be arbitrarily selected. It is also possible to read an arbitrary image size or to trim the image by varying the mode of movement of the X-Y stage, thereby reading and synthesizing only a part, for example 4 areas, of the 9 divided areas of the present embodiment.

As explained in the foregoing, the present invention obtains divided image signals by moving the image pickup surface with respect to an object image formed on the image plane and synthesizes said divided images, thereby obtaining a still image of high definition of a wide image angle, without loss in the resolving power.

The device of the present invention is also simple in structure and can therefore be made compact. Furthermore, because of the image entry conducted for each position of the image pickup surface, the time required for image input can be reduced in comparison with the conventional structure utilizing a line sensor, thus also avoiding the drawback of eventual displacement of the object image due to an external vibration in the course of the image entry.

I claim:

1. An apparatus comprising:

means for forming an object image on a predetermined plane;

image pickup means having an image pickup surface positioned substantially on said predetermined plane, said image pickup means producing an electrical image signal from light incident thereon;

moving means for two-dimensionally moving said image pickup means along said predetermined plane in an image detection area substantially larger than the area of said image pickup surface;

memory means;

processing means for processing said electrical image signal and storing the processed signal in said memory means;

control means for controlling said moving means to move and stop said image pickup means in said detection area so as to position and stop said image pickup surface successively in a plurality of non-overlapping positions in said detection area, and for controlling said image pickup means and said processing means such that said image pickup means produces an electrical image signal at each of said plurality of positions and said processing means processes each electrical image signal and stores the corresponding processed signal in said memory means; and synthesizing means for synthesizing an image signal representing the portion of the object image corresponding to said plurality of positions on the basis of the processed signals stored in said memory means.

2. An apparatus according to claim 1, wherein the number of said positions is odd, and said control means controls said moving means such that said image pickup surface is first positioned at a central area in said detecting area.

* * * * *